(12) United States Patent
Srivastava et al.

(10) Patent No.: US 7,376,937 B1
(45) Date of Patent: May 20, 2008

(54) METHOD AND MECHANISM FOR USING A META-LANGUAGE TO DEFINE AND ANALYZE TRACES

(75) Inventors: Alok K. Srivastava, Newark, CA (US); Surojit Chatterjee, Mountain View, CA (US); Sunil Kumar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 864 days.

(21) Appl. No.: 09/872,590

(22) Filed: May 31, 2001

(51) Int. Cl.
*G06F 9/44* (2006.01)
*G06F 9/45* (2006.01)

(52) U.S. Cl. .................. 717/128; 717/126; 717/127

(58) Field of Classification Search ........ 717/124–129, 717/130, 135, 117; 707/10; 714/38; 702/14
See application file for complete search history.

(56) References Cited

U.S. PATENT DOCUMENTS

| | | | | |
|---|---|---|---|---|
| 3,707,725 | A * | 12/1972 | Dellheim | 714/38 |
| 4,462,077 | A | 7/1984 | York | |
| 5,390,316 | A | 2/1995 | Cramer et al. | |
| 5,537,319 | A * | 7/1996 | Schoen | 702/14 |
| 5,594,904 | A * | 1/1997 | Linnermark et al. | 717/124 |
| 5,649,085 | A | 7/1997 | Lehr | |
| 5,689,636 | A | 11/1997 | Kleber et al. | |
| 5,708,825 | A | 1/1998 | Sotomayor | |
| 5,870,606 | A | 2/1999 | Lindsey | |
| 5,920,719 | A * | 7/1999 | Sutton et al. | 717/130 |
| 5,963,739 | A * | 10/1999 | Homeier | 717/126 |
| 5,963,740 | A * | 10/1999 | Srivastava et al. | 717/130 |
| 6,026,362 | A | 2/2000 | Kim et al. | |
| 6,083,281 | A * | 7/2000 | Diec et al. | 717/128 |
| 6,164,841 | A | 12/2000 | Mattson, Jr. et al. | |
| 6,189,141 | B1 | 2/2001 | Benitez et al. | |
| 6,202,099 | B1 | 3/2001 | Gillies et al. | |
| 6,202,199 | B1 * | 3/2001 | Wygodny et al. | 717/125 |
| 6,282,701 | B1 | 8/2001 | Wygodny et al. | |
| 6,289,503 | B1 * | 9/2001 | Berry et al. | 717/128 |
| 6,311,326 | B1 * | 10/2001 | Shagam | 717/128 |
| 6,338,159 | B1 * | 1/2002 | Alexander et al. | 717/128 |
| 6,339,775 | B1 | 1/2002 | Zamanian et al. | |
| 6,349,406 | B1 | 2/2002 | Levine et al. | |
| 6,351,844 | B1 * | 2/2002 | Bala | 717/128 |
| 6,353,898 | B1 | 3/2002 | Wipfel et al. | |
| 6,353,924 | B1 | 3/2002 | Ayers et al. | |
| 6,470,349 | B1 | 10/2002 | Heninger et al. | |

(Continued)

OTHER PUBLICATIONS

IBM technical disclosure Bulletin, CHECKREF: Method for Effectively Identifying IBM Bookmaster Document Markup Language Coding Errors, Feb. 1994, pp. 379-392.*

(Continued)

*Primary Examiner*—Wei Zhen
*Assistant Examiner*—Satish S Rampuria
(74) *Attorney, Agent, or Firm*—Bingham McCutchen LLP (57) ABSTRACT

A method and mechanism for utilizing a meta-language to define and analyze traces is disclosed. A set of trace format grammars can be defined for traces. Each trace format grammar is preferably compliant with guidelines for a meta-language grammar. The trace format grammars can be examined to form a suitable analyzing mechanism, such as a parser, to analyze the traces.

30 Claims, 8 Drawing Sheets

U.S. PATENT DOCUMENTS

| | | | |
|---|---|---|---|
| 6,480,886 B1 | 11/2002 | Paice | |
| 6,507,805 B1 | 1/2003 | Gordon et al. | |
| 6,513,155 B1 | 1/2003 | Alexander, III et al. | |
| 6,546,548 B1 | 4/2003 | Berry et al. | |
| 6,553,564 B1 | 4/2003 | Alexander, III et al. | |
| 6,574,792 B1 | 6/2003 | Easton | |
| 6,584,491 B1 | 6/2003 | Niemi et al. | |
| 6,598,012 B1 | 7/2003 | Berry et al. | |
| 6,654,749 B1 * | 11/2003 | Nashed | 707/10 |
| 6,658,652 B1 * | 12/2003 | Alexander et al. | 717/128 |
| 6,678,883 B1 * | 1/2004 | Berry et al. | 717/128 |
| 6,694,507 B2 | 2/2004 | Arnold et al. | |
| 6,708,173 B1 * | 3/2004 | Behr et al. | 707/10 |
| 6,715,140 B1 * | 3/2004 | Haga | 717/130 |
| 6,732,095 B1 | 5/2004 | Warshavsky et al. | |
| 6,738,778 B1 | 5/2004 | Williamson et al. | |
| 6,738,965 B1 * | 5/2004 | Webster | 717/128 |
| 6,748,583 B2 * | 6/2004 | Aizenbud-Reshef et al. | 717/127 |
| 6,751,753 B2 | 6/2004 | Nguyen et al. | |
| 6,754,890 B1 * | 6/2004 | Berry et al. | 717/128 |
| 6,769,115 B1 * | 7/2004 | Oldman | 717/126 |
| 6,802,054 B2 * | 10/2004 | Faraj | 717/128 |
| 6,826,747 B1 * | 11/2004 | Augsburg et al. | 717/128 |
| 6,862,711 B1 * | 3/2005 | Bahrs et al. | 715/205 |
| 6,877,081 B2 | 4/2005 | Herger et al. | |
| 7,251,809 B2 * | 7/2007 | Barclay et al. | 717/128 |
| 2001/0011360 A1 | 8/2001 | Shigeta | |
| 2002/0004803 A1 | 1/2002 | Serebrennikov | |
| 2002/0016771 A1 | 2/2002 | Carothers et al. | |
| 2002/0019837 A1 | 2/2002 | Balnaves | |
| 2002/0066081 A1 | 5/2002 | Duesterwald et al. | |
| 2002/0073063 A1 | 6/2002 | Faraj | |
| 2002/0078143 A1 | 6/2002 | De Boor et al. | |
| 2002/0087592 A1 | 7/2002 | Ghani | |
| 2002/0087949 A1 | 7/2002 | Golender et al. | |
| 2002/0095660 A1 * | 7/2002 | O'Brien et al. | 717/127 |
| 2002/0107882 A1 | 8/2002 | Gorelick et al. | |
| 2002/0120634 A1 | 8/2002 | Min et al. | |
| 2002/0133806 A1 * | 9/2002 | Flanagan et al. | 717/123 |
| 2002/0161672 A1 | 10/2002 | Banks et al. | |
| 2003/0088854 A1 | 5/2003 | Wygodny et al. | |
| 2003/0140045 A1 | 7/2003 | Heninger et al. | |
| 2004/0158819 A1 * | 8/2004 | Cuomo et al. | 717/128 |
| 2004/0205718 A1 * | 10/2004 | Reynders | 717/124 |
| 2004/0216091 A1 * | 10/2004 | Groeschel | 717/128 |
| 2004/0216092 A1 * | 10/2004 | Ayers et al. | 717/135 |

OTHER PUBLICATIONS

Metalanguae, http://en.wikipedia.org/wiki/Meta-language, accessed on Feb. 2, 2006, pp. 1-3.*

Webster, Document interchange standards, Wiley encyclopedia of Electrical and Electronics Engineering, 1999, pp. 33-39.*

A software approach to multiprocessor address trace generation, Azimi, M.; Erickson, C., Computer Software and Applications Conference, 1990. COMPSAC 90. Proceedings., Fourteenth Annual International, Oct. 31-Nov. 2, 1990, IEEE,□□pp. 99-105.*

Trace-driven and program-driven simulation: a comparison, Malloy, B.A., Modeling, Analysis, and Simulation of Computer and Telecommunication Systems, 1994., MASCOTS '94., Proceedings of the Second International Workshop on, Jan. 31-Feb. 2, 1994, IEEE, pp. 395-396.*

SIMPLE: a universal tool box for event trace analysis, Dauphin, P.; Hofmann, R.; Lemmen, F.; Mohr, B., □□Computer Performance and Dependability Symposium, 1996., Proceedings of IEEE International, Sep. 4-6, 1996, pp. 59-59 □□.*

Agosti, Maristelle and Alan Smeaton. 1996. *Information Retrieval and Hypertext.* Boston: Kluwer Academic Publishers. ISBN 0-7923-9710-X.

Akscyn, Robert, Donald McCracken, and Elise Yoder. 1987. "KMS: A Distributed Hypermedia System for Managing Knowledge in Organizations." In *Proceedings of Hypertext '87*, Chapel Hill, NC. Nov. 13-15, 1987. NY: Association for Computing Machinery Press, pp. 1-20.

Berners-Lee, T. and L. Masinter, editors. Dec. 1994. "Uniform Resource Locators (URL)". IETF document RFC 17338.

Bradner, S. editor. Key words for use in RFCs to Indicate Requirement Levels. Mar. 1997, http://www.ietf.org/rfc/rfc2119.txt.

Bray, Tim, Dave Hollander, and Andrew Layman, editors. Namespaces in XML. Textuality, Hewlett-Packard, and Microsoft. World Wide Web Consortium, 1999, http://www.w3.org/TR/REC-xml-names/.

Bray, Tim, Jean Paoli, and C.M. Sperberg-McQueen, editors. Extensible Markup Language (XML) 1.0. World Wide Web Consortium, Oct. 2000, http://www.w3.org/TR/REC-xml.

Bush, Vannevar. 1945. "As We May Think." *Atlantic Monthly* 176 Jul. 1945, pp. 101-108.

Catano, James V. 1979. "Poetry and Computers: Experimenting with the Communal Text." In *Computers and the Humanities* 13 (9): pp. 269-275.

Chatterjee, Sunojit, "Trace Navigation and Analyzer Tool Prototype (High Level Design: First Draft" Apr. 12, 2000.

Clark, James and Steve DeRose, editors. XML Path Language (XPath). World Wide Web Consortium, 1999, http://www.w3.org/TR/xpath.

Conklin, Jeff. 1987. "Hypertext: An Introduction and Survey." *IEEE Computer* 20 (9): pp. 17-41.

Cowan, John and David Megginson, editors. XML Information Set. World Wide Web Consortium, Dec. 1999, http://www.w3.org/TR/xml-infoset-19991220.

DeRose, Steve and Andries van Dam. 1999. "Document structure and markup in the FRESS Hypertext System." Markup Languages 1 (1) Winter. Cambridge: MIT Press: pp. 7-32.

DeRose, Steve, editor. XML XLink Requirements Version 1.0. Brown University. Seekonk: World Wide Web Consortium, 1999.

DeRose, Steve, editor. XML XPointer Language Requirements Version 1.0. World Wide Web Consortium, 1999. (See http://www.w3.org/TR/NOTE-xptr-req.).

DeRose, Steve, Eve Maler, David Orchard, and Ben Trafford, editors. XML Linking Language (XLink). World Wide Web Consortium, Dec. 2000. http://www.w3.org/TR/xlink/.

DeRose, Steven J. 1989. "Expanding the Notion of Links." In *Proceedings of Hypertext '89*, Pittsburgh, PA. NY: Association for Computing Machinery Press.

Document Object Model (DOM) Level 2 Specification: Version 1.0. World Wide Web Consortium, 1999. (See http://www.w3.org/TR/DOM-Level-2/.).

Dürst, Martin et al., eds. *"Character Model for the World Wide Web 1.0"*, World Wide Web Consortium, 2001. http://www.w3.org/TR/2001/WD-charmod-20010126/.

Engelbart, Douglas C. 1963. "A Conceptual Framework for the Augmentation of Man's Intellect". In *Vistas in Information Handling*, vol. 1 (P. Howerton, ed.). Washington, DC: Spartan Books: 1-29. Reprinted in Greif, Irene (ed.), 1988. *Computer-Supported Cooperative Work: A Book of Readings*. San Mateo, California: Morgan Kaufmann Publishers, pp. 35-65. ISBN 0934613575.

Furuta, Richard, Frank M. Shipmann III, Catherine C. Marshall, Donald Brenner, and Hao-wei Hsieh. 1997. "Hypertext paths and the World-Wide Web: Experiences with Walden's Paths." In *Proceedings of Hypertext '97*. NY: Association for Computing Machinery Press.

Garrett, L. Nancy, Karen E. Smith, and Norman Meyrowitz. 1986. "Intermedia: Issues, Strategies, and Tactics in the Design of a Hypermedia System." In *Proceedings of the Conference on Computer-Supported Cooperative Work*.

Gibson, David, Jon Kleinberg, and Prabhakar Raghavan. 1998. "Inferring Web Communities from Link Topology." In *Proceedings of Hypertext '98*, Pittsburgh, PA. NY: Association for Computing Machinery Press.

Grønbaek, Kaj and Randall H. Trigg. 1996. "Toward a Dexter-based model for open hypermedia: Unifying embedded references and link objects." In Proceedings of Hypertext '96. NY: Association for Computing Machinery Press. Also available online.

Halasz, Frank. 1987. "Reflections on NoteCards: Seven Issues for the Next Generation of Hypermedia Systems." Address presented at Hypertext '87, Nov. 13-15, 1987. Reprinted in *Communications of the Association for Computing Machinery* 31 (7), Jul. 1988: 836-855.

Halasz, Frank. 1994. "The Dexter Hypertext Reference Model." In *Communications of the Association for Computing Machinery* 37 (2), Feb. 1994: 30-39.

Hall, Wendy, Hugh Davis, and Gerard Hutchings. 1996. *Rethinking Hypermedia: The Microcosm Approach*. Boston: Kluwer Academic Publishers. ISBN 0-7923-9679-0.

Hardman, Lynda, Dick C. A. Bulterman, and Guido van Rossum. 1994. "The Amsterdam Hypermedia Model: Adding Time and Context to the Dexter Model." In *Communications of the Association for Computing Machinery* 37.2 (Feb. 1994): 50-63.

Hinden, R., et al., "Format for Literal IPv6 Addresses in URL's." Internet Engineering Task Force, 1999. (See http://www.ietf.org/rfc/rfc2732.txt.).

ISO/IEC 10744-1992 (E). Information technology—Hypermedia/Time-based Structuring Language (HyTime). Geneva: International Organization for Standardization, 1992. Extended Facilities Annex. [Geneva]: International Organization for Standardization, 1996. (See http://www.ornl.gov/sgml/wg8/docs/n1920/html/n1920.html.).

Kahn, Paul. 1991. "Linking Together Books: Experiments in Adapting Published Material into Intermedia Documents." In Paul Delany and George P. Landow (eds), *Hypermedia and Literary Studies*. Cambridge: MIT Press.

Landow, George P. 1987. "Relationally Encoded Links and the Rhetoric of Hypertext." In *Proceedings of Hypertext '87*, Chapel Hill, NC, Nov. 13-15, 1987. NY: Association for Computing Machinery Press: 331-344.

Lassila, Ora and Ralph Swick, editors. Resource Description Framework (RDF) Model and Syntax Specification. World Wide Web Consortium, 1999. http://www.w3.org/TR/REC-rdf-syntax/.

Maler, Eve and Steve DeRose, editors. XML Linking Language (XLink) World Wide Web Consortium, Mar. 1998. http://www.w3.org/TR/1998/WD-xlink-19980303.

Marsh, Jonathan, editor. XML Base (XBase). World Wide Web Consortium, Dec. 1999. http://www.w3.org/TR/1999/WD-xmlbase-19991220.

Marshall, Catherine C., Frank M. Shipman, III, and James H. Coombs. 1994. "VIKI: Spatial Hypertext Supporting Emergent Structure". In *Proceedings of the 1994 European Conference on Hypertext*. NY: Association for Computing Machinery Press.

Meyrowitz, Norman. 1986. "Intermedia: the Architecture and Construction of an Object-Oriented Hypermedia system and Applications Framework." In *Proceedings of OOPSLA*. Portland, OR.

Nelson, Theodore H, "Literary Machines", Mindful Press, Sausalito, 1992.

Raggett, Dave et al., "HTML 4.01 Specification". World Wide Web Consortium, Dec. 1999. http://www.w3.org/TR/html4/.

Sperberg-McQueen C.M. and Lou Burnard, editors.Guidelines for Electronic Text Encoding and Interchange. Association for Computers and the Humanities (ACH), Association for Computational Linguistics (ACL), and Association for Literary and Linguistic Computing (ALLC). Chicago, Oxford: Text Encoding Initiative, 1994.

Trigg, Randall H. 1988. "Guided Tours and Tabletops: Tools for Communicating in a Hypertext Environment." In *ACM Transactions on Office Information Systems*, 6.4 (Oct. 1988): 398-414.

Trigg, Randall H. 1991. "From Trailblazing to Guided Tours: The Legacy of Vannevar Bush's Vision of Hypertext Use." In Nyce, James M. and Paul Kahn, eds, 1991, From Memex to Hypertext: Vannevar Bush and the Mind's Machine. San Diego: Academic Press, pp. 353-367. A thorough review.

van Ossenbruggen, Jacco, Anton Eliëns and Lloyd Rutledge. "The Role of XML in Open Hypermedia Systems." Position paper for the 4th Workshop on Open Hypermedia Systems, ACM Hypertext '98. http://aue.auc.dk/~kock/OHS-HT98/Papers/ossenbruggen.html.

Whitehead, E., "XML Media Types." Internet Engineering Task Force, Network Working Group, Jul. 1998. http://www.ietf.org/rfc/rfc2376.txt.

*XHTML 1.0: The Extensible HyperText Markup Language*. World Wide Web Consortium, Jan. 2000. (See http://www.w3.org/TR/2000/REC-xhtml1-20000126/.

Yankelovich, Nicole, Bernard J. Haan, Norman K. Meyrowitz, and Steven M. Drucker. 1988. "Intermedia: The Concept and the Construction of a Seamless Information Environment." *IEEE Computer* (Jan. 1988): 81-96.

Yankelovich, Nicole, Norman Meyrowitz, and Andries van Dam. 1985. "Reading and Writing the Electronic Book." *IEEE Computer* 18 (Oct. 1985): 1-30.

Yergeau, F., Network Working Group, "UTF-8, a transformation format of ISO 10646." Internet Engineering Task Force, 1998. http://www.ietf.org/rfc/rfc2279.txt.

Zellweger, Polle T. 1989. "Scripted Documents: A Hypermedia Path Mechanism." in *Proceedings of Hypertext '89*. NY: Association for Computing Machinery Press, Nov. 1989.

Biswas, P. et al. "Trace Driven Analysis of Write Caching Policies for Disks" *Proceedings of the 1993 ACM SIGMETRICS Conference on Measurement and Modeling of Computer Systems* (1993) pp. 13-23.

Borg, A. et al. "Generation and Analysis of Very Long Address Traces" *Proceedings of the 17th Annual International Symposium on Computer Architecture* (May 1990) 18(3):270-279.

Chang, P. P. and W.-M. W. Hwu "Trace Selection for Compiling Large C Application Programs to Microcode" *Proceedings of the 21st Annual Workshop on Microprogramming and Microarchitecture* (Jan. 1988) pp. 21-29.

Colby, C. and P. Lee "Trace-Based Program Analysis" *Proceedings of the 23rd ACM SIGPLAN-SIGACT Symposium on Principles of Programming Languages*" (Jan. 1996) pp. 195-207.

Dan, A. et al. "Characterization of Database Access Pattern for Analytic Prediction of Buffer Hit Probability" *VLBD Journal* (1995) 4:127-154.

Ducasse, M. "Coca: An automated Debugger for C" *Proceedings of the 21st International Conference on Software Engineering* (May 1999) pp. 504-513.

Ezust, S.A. and G. v. Bochmann "An Automatic Trace Analysis Tool Generator for Estelle Specifications" *Proceedings of the Conference on Applications, Technologies, Agricultures and Protocols for Computer Communication* (Oct. 1995) 25(4):175-184.

Goldszmidt, G. S. and S. Yemini "High-Level Language Debugging for Concurrent Programs" *ACM Transactions on Computer Systems (TOCS)* (Nov. 1990) 8(4):311-336.

Hsu, W. W. et al. "I/O Reference Behavior of Production Database Workloads and the TPC Benchmarks—An Analysis at the Logical Level" *ACM Transactions on Database Systems (TODS)* (Mar. 2001) 26(1):96-143.

LeDoux, C. H. and D. S. Parker, Jr. "Saving Traces for ADA Debugging" *Proceedings of the 1985 Annual ACM SIGAda International Conference on Ada* (May 1985) V(2):97-108.

Lencevicius, R. et al. "Third Eye—Specification-Based Analysis of Software Execution Traces" *Proceedings of the 22nd International Conference on Software Engineering* (Jun. 2000) p. 772.

Lo, J. L. et al. "An Analysis of Database Workload Performance on Simultaneous Multithreaded Processors" *Proceedings of the 25th Annual International Symposium on Computer Architecture* (Apr. 1998) 26(3):39-50.

Miller, B.P. and J.-D. Choi "A Mechanism for Efficient Debugging of Parallel Programs" *Proceedings of the ACM SIGPLAN 1998 Conference on Programming Language Design and Implementation* (Jun. 1988) pp. 135-144.

Putrycz, E. "Using Trace Analysis for Improving Performance in COTS Systems" *Proceedings of the 2004 Conference of the Centre for Advanced Studies on Collaborative Research* (Oct. 2004) pp. 1-13.

Rahm. E. "Empirical Performance Evaluation of Concurrency and Coherency Control Protocols for Database Sharing Systems" *ACM Transactions on Database Systems (TODS)* (Jun. 1993) 18(2):333-377.

Ramakrishnan, K. K. "Analysis of File I/O Traces in Commercial Computing Environments" *Proceedings of the 1992 ACM SIGMETRICS Joint International Conference on Measurement and Modeling of Computer Systems* (Jun. 1992) 20(1):78-90.

Reiss, S.P. and M. Renieris "Generating Java Trace Data" *Proceedings of the ACM 2000 Conference on Java Grande* (Jun. 2000) pp. 71-77.

Singhal, V. and A.J. Smith "Analysis of locking behavior in three real database systems" *The VLDB Journal* (1997) 6:40-52.

Helmbold, D.P. et al. "Detecting Data Races from Sequential Traces" IEEE (1991) pp. 408-417.

Tolujev, J. et al. "Assessment of Simulation Models Based on Trace-File Analysis: A Metamodeling Approach" IEEE Proceedings of the 1998 Winter Simulation Conference (1998) 1:443-450.

Helmbold, D.P. "Determining Possible Event Orders by Analyzing Sequential Traces" IEEE (Jul. 1993) 4(7):827-840.

Palnitkar, S. et al. "Finite State Machine Trade Analysis Program" IEEE (1994) pp. 52-57.

www.google.com, searched on Mar. 21, 2005 pp. 1-12, located at http://greenspun.com/seia/glossary.

* cited by examiner

METHOD AND MECHANISM FOR USING A META-LANGUAGE TO DEFINE AND ANALYZE TRACES

BACKGROUND AND SUMMARY

Tracing is an approach for logging the state of computer applications at different points during its course of execution. Tracing is normally implemented by inserting statements in the computer application code that outputs status/state messages ("traces") as the statements are encountered during the execution of the code. Statements to generate traces are purposely placed in the computer application code to generate traces corresponding to activities of interest performed by specific sections of the code. The generated trace messages can be collected and stored during the execution of the application to form a trace log.

Programmers often use tracing and trace logs to diagnose problems or errors that arise during the execution of a computer application. When such a problem or error is encountered, trace logs are analyzed to correlate trace messages with the application code to determine the sequence, origin, and effects of different events in the systems and how they impact each other. This process allows analysis/diagnoses of unexpected behavior or programming errors that cause problems in the application code.

In a parallel or distributed environment, there are potentially a number of distributed network nodes, with each node running a number of distinct execution entities such as threads, tasks or processes (hereinafter referred to as "threads"). In many modern computer applications, these threads perform complex interactions with each other, even across the network to threads on other nodes. Often, each of the distributed nodes maintains a separate log file to store traces for their respective threads. Each distributed node may also maintain multiple trace logs corresponding to separate threads on that node.

Diagnosing problems using multiple trace logs often involves a manual process of repeatedly inspecting different sets of the trace logs in various orders to map the sequence and execution of events in the application code. This manual process attempts to correlate events in the system(s) with the application code to construct likely execution scenarios that identify root causes of actual or potential execution problems. Even in a modestly distributed system of a few nodes, this manual process comprises a significantly complex task, very much limited by the capacity of a human mind to comprehend and concurrently analyze many event scenarios across multiple threads on multiple nodes. Therefore, analyzing traces to diagnose applications in parallel and/or distributed systems is often a time consuming and difficult exercise fraught with the potential for human limitations to render the diagnoses process unsuccessful. In many cases, the complexity of manual trace analysis causes the programmer to overlook or misdiagnose the real significance of events captured in the trace logs. With the increasing proliferation of more powerful computer systems capable of greater execution loads across more nodes, the scope of this problem can only increase.

An improved approach to diagnosing computer systems and applications uses trace messages that are materialized in a markup language syntax. Hyperlinks can be placed in the trace messages to facilitate navigation between sets of related traces. One method to generate trace messages having markup language syntax is to first generate trace strings from an application having a known set of fixed formats, in which the process for extracting information to create a new version of the trace in a markup language syntax is driven by knowledge of the position and existence of specific data in the trace strings. This type of approach is described in more detail in co-pending U.S. patent application Ser. No. 09/872,647, entitled "Method and Mechanism for Diagnosing Computer Applications Using Traces," filed on even date herewith, which is hereby incorporated by reference in its entirety.

Trace tools that access fixed format traces expect information in the trace string to appear in a predetermined sequence. However, information in the trace string may not be properly recognized if deviations occur from the exact requirements of the fixed format for the trace. With the fixed format trace approach, changes to the trace string format may require changes in the corresponding tools used to parse and tokenize the trace strings, and these changes could involve significant modification or rewrites to the underlying programming code for the trace tools. Yet it may be highly desirable to allow customization of trace string formats without requiring the burden of modifying or rewriting corresponding trace tools.

The present invention provides a method and mechanism for utilizing a meta-language to define and analyze traces. According to an embodiment, non-fixed format traces are used to generate and materialize traces that incorporate markup language syntax. With this aspect of the invention, changes to a trace format do not necessitate code changes in the corresponding tools for navigating through traces. Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is disclosed in an embodiment as a method and mechanism for implementing tracing and trace logs. The disclosed embodiment of the invention is directed to trace logs for distributed and parallel systems. However, the principles presented here are equally applicable to trace log(s) in other system architecture configurations, including single node configurations, and thus the scope of the invention is not to be limited to the exact embodiment shown herein.

An aspect of one embodiment of the present invention is directed to traces comprising markup language syntax. A markup language is a collected set of syntax definitions that describes the structure and format of a document page. A widely used markup language is the Standard Generalized Markup language ("SGML"). A common variant of SGML is the HyperText Markup Language ("HTML"), which is a specific application of SGML used for the world wide web. The Extensible Markup Language ("XML") is another variant of SGML. For explanatory purposes only, the invention is described using HTML-compliant markup language syntax. However, it is noted that the present invention is not limited to any specific markup language syntax, but is configurable to work with many markup languages.

Figure 1:
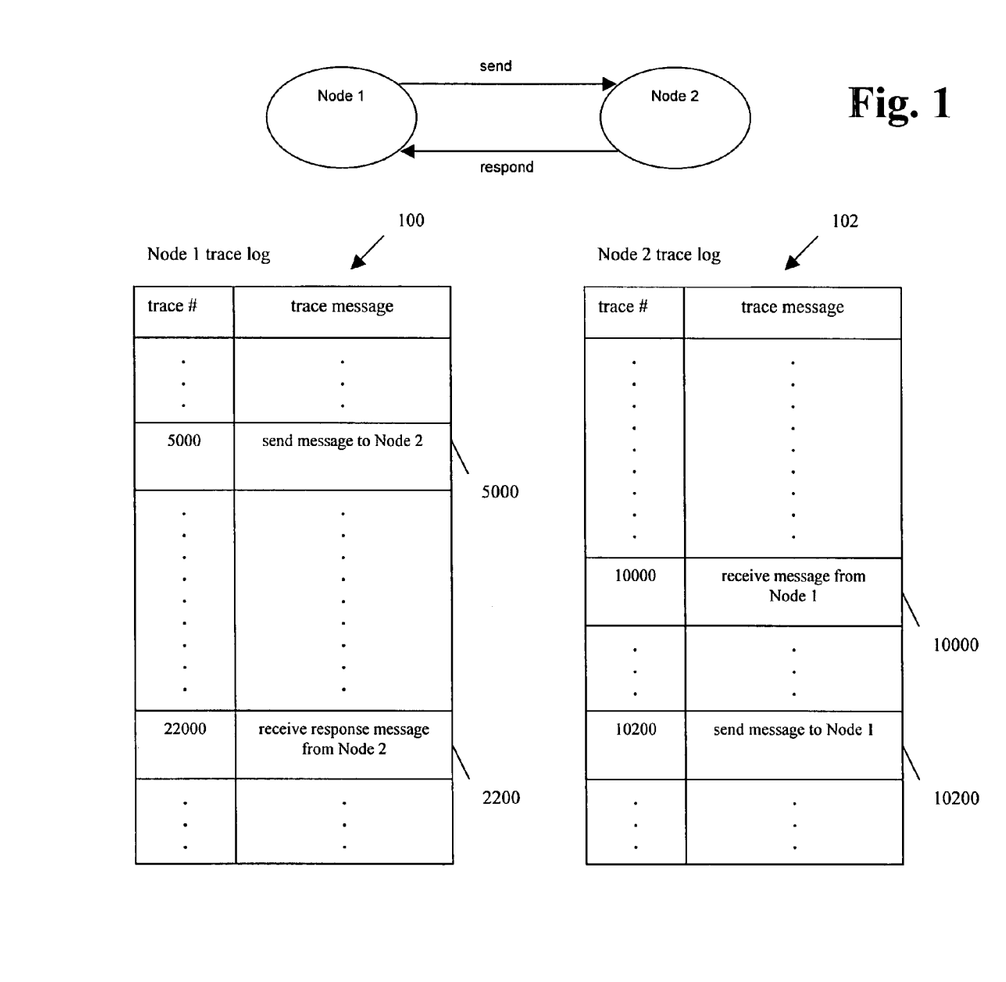
FIG. 1 shows an example of a communications operation between two network nodes and corresponding trace logs.

Analysis of traces is greatly facilitated pursuant to an embodiment of the present invention by using traces implemented with markup language syntax. To illustrate this aspect of the invention, consider a simple communications operation that is performed between two network nodes. FIG. 1 shows Nodes 1 and 2 executing an operation that consists of a first message that is sent from Node 1 to Node 2 and a response message that is subsequently sent from Node 2 to Node 1. Assume that a first trace log 100 maintains traces for threads executing on Node 1 and a second trace log 102 maintains traces for threads executing on Node 2.

When analyzing trace logs for communications operations that send messages between network nodes, it is common for sets of related traces to appear in multiple trace logs across the network. For example, a "send" operation trace in a first trace log at a first node often has a counterpart "receive" operation trace located in a second trace log at a second node. Thus in the example of FIG. 1, the trace for the initial "send" operation from Node 1 to Node 2 is stored in log file 100 as trace message 5000. The trace for the "receive" operation that occurs on Node 2 is stored in trace log 102 as trace message 10000. The trace for the subsequent "send response" operation from Node 2 to Node 1 is stored as trace message 10200 in trace log 102. The trace for the "receive" operation that occurs at Node 1 for the response message is stored as trace message 22000 in trace log 100.

Consider if it is desired to analyze/diagnose this communications operation between Node 1 and Node 2. When a programmer analyzes the set of traces corresponding to that communications operation, it is likely that the programmer must review both the send and receive traces. In this example, the send and receive traces for the communications operation are spread across multiple trace logs on multiple nodes, and the traces of interest may be buried among hundreds or thousands of irrelevant traces that correspond to applications/operations of no immediate interest. Even in this very simple example, analysis of the trace logs could involve a complex and time-consuming task just to identify the traces of interest. That difficult task is compounded by the additional burden needed to manually jump between the different trace logs to chase the chain of traces across the multiple network nodes. In the real world, this analysis/diagnosis task could become far more difficult because of messaging operations that involve many more threads across many more network nodes.

To address this problem, one embodiment of the present invention materializes trace messages using a markup language syntax. By implementing trace messages using markup language syntax, navigational intelligence can be embedded into the trace messages using "hyperlinks." A hyperlink is an element in an electronic document or object that links to another place in same document/object or to an entirely different document/object. As noted above, when a programmer analyzes the set of traces corresponding to that communications operation, it is likely that the programmer must review both the send and receive traces. For this reason, it is useful to link related communications traces at the senders and receivers of inter-nodal messages. Thus, a send trace is hyperlinked to its counterpart receive trace. The hyperlinks can be defined in both the forward and reverse directions. A chain of linked traces can be established whereby each trace is hyperlinked in sequential order to both its predecessor and successor trace. All traces relating to a common operation or activity are therefore linked together via a chain of hyperlinks extending from a first trace through all other related traces.

Figure 2:
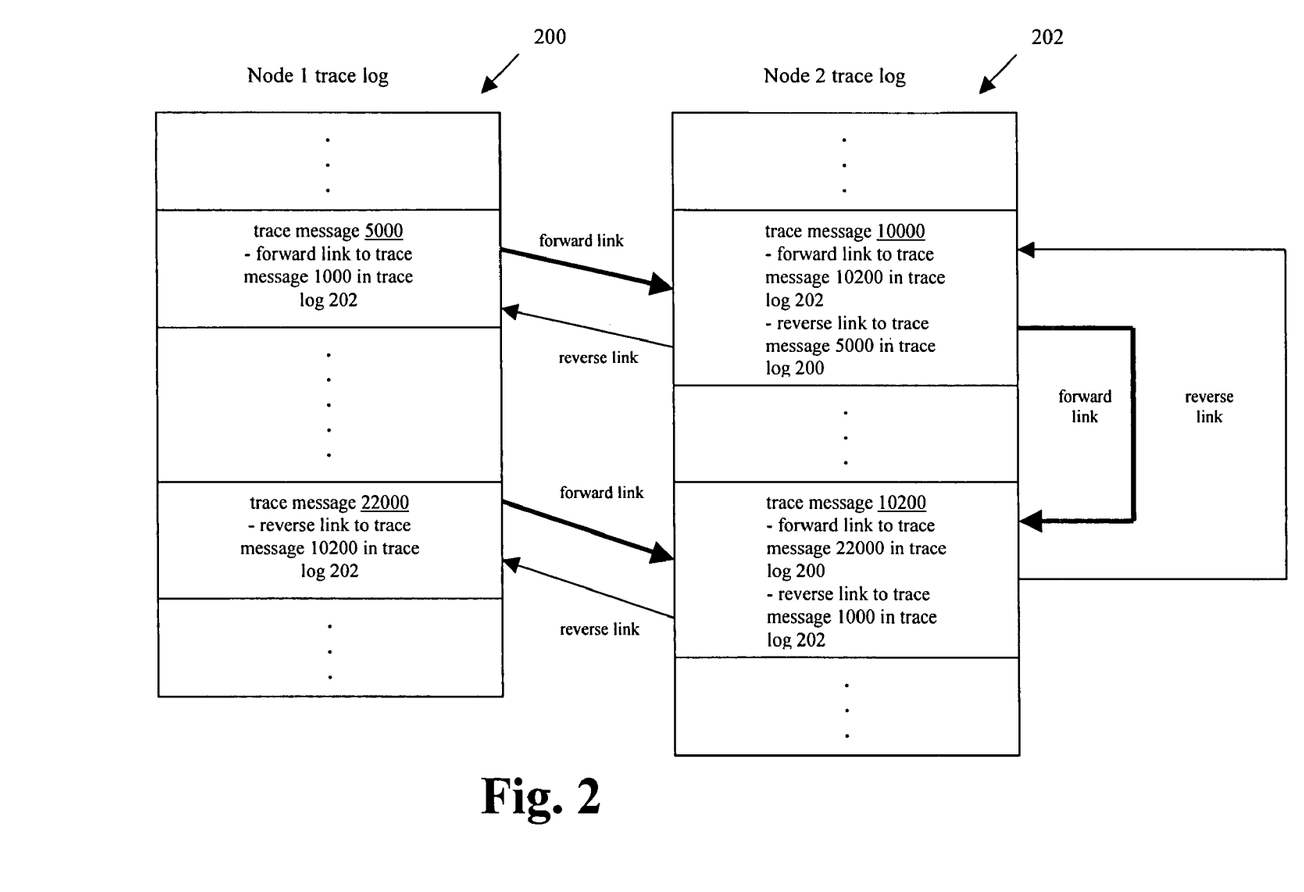
FIG. 2 shows trace logs including traces in markup language pseudocode according to an embodiment of the invention.

FIG. 2 depicts trace logs 200 and 202 that include traces messages implemented using markup language pseudocode. Trace log 200 corresponds to trace log 100 of FIG. 1 and contains traces generated by threads on Node 1. Trace log 202 corresponds to trace log 102 of FIG. 1 and contains traces for threads on Node 2. Each of the trace messages for the communications operation shown in FIG. 1 are represented in FIG. 2 using markup language pseudocode to illustrate hyperlinks between related trace messages. In particular, the "send" trace message 5000 in trace log 200 includes a forward hyperlink to its corresponding "receive" trace message 10000 in trace log 202. The "receive" trace message 10200 includes a reverse hyperlink to the "send" trace message 5000. The "send response" trace message 10200 in trace log 202 is forward linked to its corresponding "receive response" trace message 22000 in trace log 200. The "receive response" trace message 22000 is reverse hyperlinked to the "send response" trace message 10200. While not a send and receive pair, trace messages 10000 and 10200 could be hyperlinked together to indicate the sequential nature of the operations corresponding to these traces. Any suitable markup language syntax may be employed to implement this type of hyperlinking.

Once the trace messages have been materialized into a markup language syntax, any browser or viewer capable of interpreting the chosen markup language may be used to navigate the trace log(s). The traces for any activity of interest can be navigated by identifying one of the activity's traces and traversing the chain of hyperlinks extending from that trace—without requiring any manual searching for related traces. Since both forward and reverse hyperlinks can be embedded into the trace log, the traces for an activity of interest can be traversed in both the forward or reverse directions.

One embodiment of the present invention provides a method and mechanism for utilizing non-fixed format traces to generate and materialize traces that incorporate markup language syntax. With this aspect, changes to a trace format do not necessitate code changes in the corresponding tools for navigating through traces.

According to an embodiment of the invention, traces in the system do not have to be in a single fixed format, but each set of traces should correspond to a defined trace format grammars ("TFG"). A trace format grammar is the set of formatting guidelines that defines the placement of information in its associated trace strings. A set of trace format grammars {TFG1, TFG2, . . . , TFGn} is defined for the tracing activities in the computing system, where TFG1 refers to a first defined trace format grammar, TFG2 refers to a second defined trace format grammar, and TFGn refers to an nth trace format grammar. Potentially, an infinite number of trace format grammars may be defined with each trace format grammar defined to address a different trace string format used in the system. Each time a new trace string format needs to be employed, a new trace grammar format is defined that is suitable for the new trace string format.

Each trace format grammar in the system should comply with a recognized meta-language grammar ("G"). A meta-language grammar ("G") is specified for the system, which comprises a set of rules from which the TFGs are specified. In effect, each trace format grammar uses a unique combination of grammar syntax specified in the meta-language grammar G to form an individual TFG. While each individual TFG include formatting differences from another individual TFG, all TFGs comply with the guidelines set forth in the meta-language grammar G. It is noted that the invention is not limited to the specific meta-language grammar shown herein; multiple different meta-language grammars may be defined and used, with the specific characteristics of the meta-language grammar(s) actually used depending upon the particular application to which the invention is directed. In one embodiment of the invention, each implementation includes only one meta-language grammar.

Figure 5:
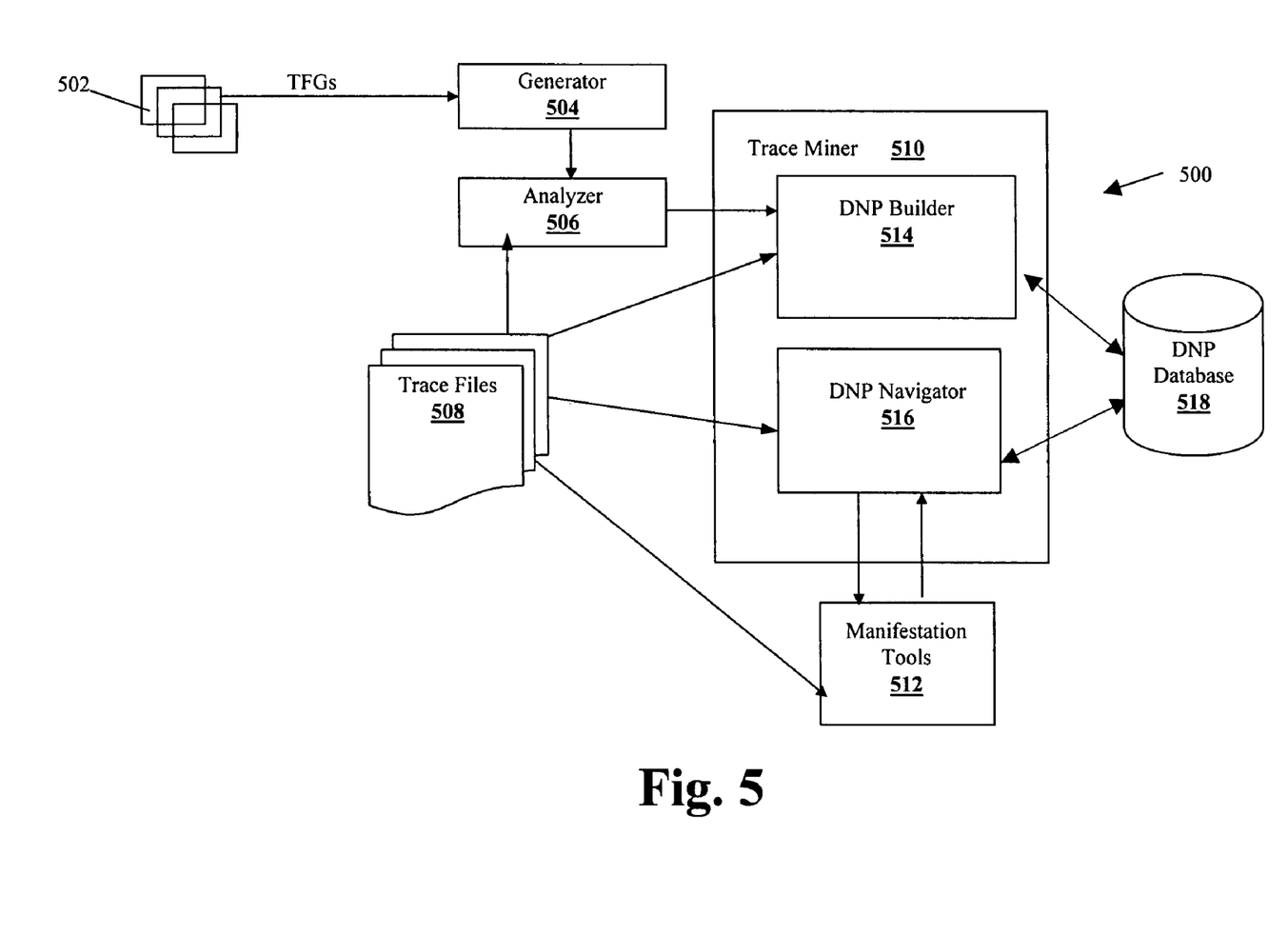
FIG. 5 is a diagram of a system for utilizing traces which do not need to be in a single fixed format according to an embodiment of the invention.

FIG. 5 shows components of a system 500 for utilizing non-fixed format traces from trace files 508 according to an embodiment of the invention. The system 500 includes a generator mechanism 504 that receives a set of TFGs 502 as input. The set of TFGs 502 comprise the formatting rules used to create each trace in trace files 508. Each TFG in the set of TFGs 502 comprises formatting definitions for a separate trace string format utilized in the trace files 508. The generator 504 verifies that each TFG in the set of TFGs 502 complies with the guidelines set forth in the meta-language grammar G. In addition, the generator 504 verifies that no conflict exists among the set of TFGs 502. If a conflict is identified, the generator 504 may provide an alert regarding the conflict or may optionally perform other operations such as dynamically correcting the error in the TFG and/or trace files 508 or to ignore the conflict. An example of such a conflict is if the generator 504 identifies two separate TFGs that define conflicting formats for trace strings incorporating the same keyword.

The generator 504 thereafter generates and/or passes trace analysis data to a unified trace analyzer mechanism 506 for all TFGs 502. In an embodiment, the analyzer 506 comprises a parser that parses and tokenizes each trace in trace files 508. To accomplish this parsing function, the analyzer 506 includes a set of rules compiled from all the rules used for each TFG in the set of TFGs 502.

As an illustrative example, consider the following grammar (BNF) for a meta-language G, in which the all-upper case letters are keywords of G, and "start" is the start symbol:

start:
   KEYWORDS ':' string_list';'
   STRING ':' string or_number ';'
   MULTI_RELATION ':' relation_list ';'
   SELF_RELATION ':' string_list ';'
   RULES ':' rules_of_g ';'
   ;

relation_list
   one_relation
   | relation_list ',' one_relation
   ;

one_relation :
   STRING "->" string_list;

string_or_number:
   STRING
   | NUMBER string_list :
   STRING
   | string_list STRING
   ;

rules_of_g :
   one_rule
   | rules_of_g '|' one_rule one_rule :
   key_word UID string_list '{' actions_list '}'
   ;

keyword: STRING;

actions_list
   one_action
   | actions_list ';' one_action one_action:
   JUMP
   | QUERY query_list ';' query_list:
   one_query
   | query_list ',' one_query
   ;

one_query:
   query '?' callback_for_query
   ;

query: string_list;

callback_for_query: STRING;

The following is an example of a TFG for this meta-language grammar, where keywords of G have been given meaningful names:
   KEYWORDS: SEND RECV RESOURCE WAIT POST EVENT;
   RULES: SEND UID number address number {JUMP;}
   | RECV UID number address number {JUMP;}
   | RESOURCE UID { QUERY who is my master?callback1, who is blocking me?callback2; JUMP;}
   | WAIT UID {JUMP;}
   | POST UID {JUMP;}
   | EVENT UID {JUMP;}
   MULTI_RELATION: WAIT ->POST EVENT, SEND -> RECV;
   number: NUMBER
   ;
   address: NUMBER
   ;

This TFG describes the trace string format for a set of traces in trace files 508. Potentially a plurality of such TFGs may be defined, with each TFG compliant with the meta-language grammar G.

In an embodiment, the system 500 internally generates following trace description language that is used as the set of rules to parse traces from trace files 508:
   rule1: SEND string number address number { register_jump_routine( );};
   rule2: RECV string number address number { register_jump_routine( );)};
   rule3: RESOURCE string { register_queries_callbacks_and_jump_routines( );} rule4: WAIT UID {register_jump_routine( );}
rule5: POST UID {register_jump_routine( );}
rule6: EVENT UID {register_jump_routine( );}
string: STRING;
number: NUMBER;
address: NUMBER;

Each of these rules is used by the analyzer 506 to parse traces from trace files 508. Each rule sets forth an expected string format for a trace having a given keyword (such as keywords "send" and "recv"). In one embodiment, these rules are compiled from all the TFGs 402 in the system.

In this example, the actions in the braces are generated to process the arguments for each rule. Thus, a trace having the keyword "SEND" is parsed by the analyzer according to rule1, with the "register_jump_routine( )" routine called as a result of recognizing that rule1 applies to this trace statement. Each query can have a callback associated with it which is called whenever a query is selected from the list of queries associated with a rule. In the example, rule3 can instantiate an occurrence of RESOURCE definition in the trace file. Each of these resource occurrences can have queries like "who is owner of this resource ? Get_owner", "who is the master of this resource ? Get_master" etc. From the interface to the system, the user selects one of the occurrences and selects a query, and thereafter the corresponding callback executes and outputs the result to the user. This callback mechanism provides the flexibility to associate algorithms with a query which can be changed without having to change the search engine (e.g., Network builder and Navigator). As set forth in more detail below, these register routines also help to build the database that tracks the navigational relationships between traces.

Figure 6:
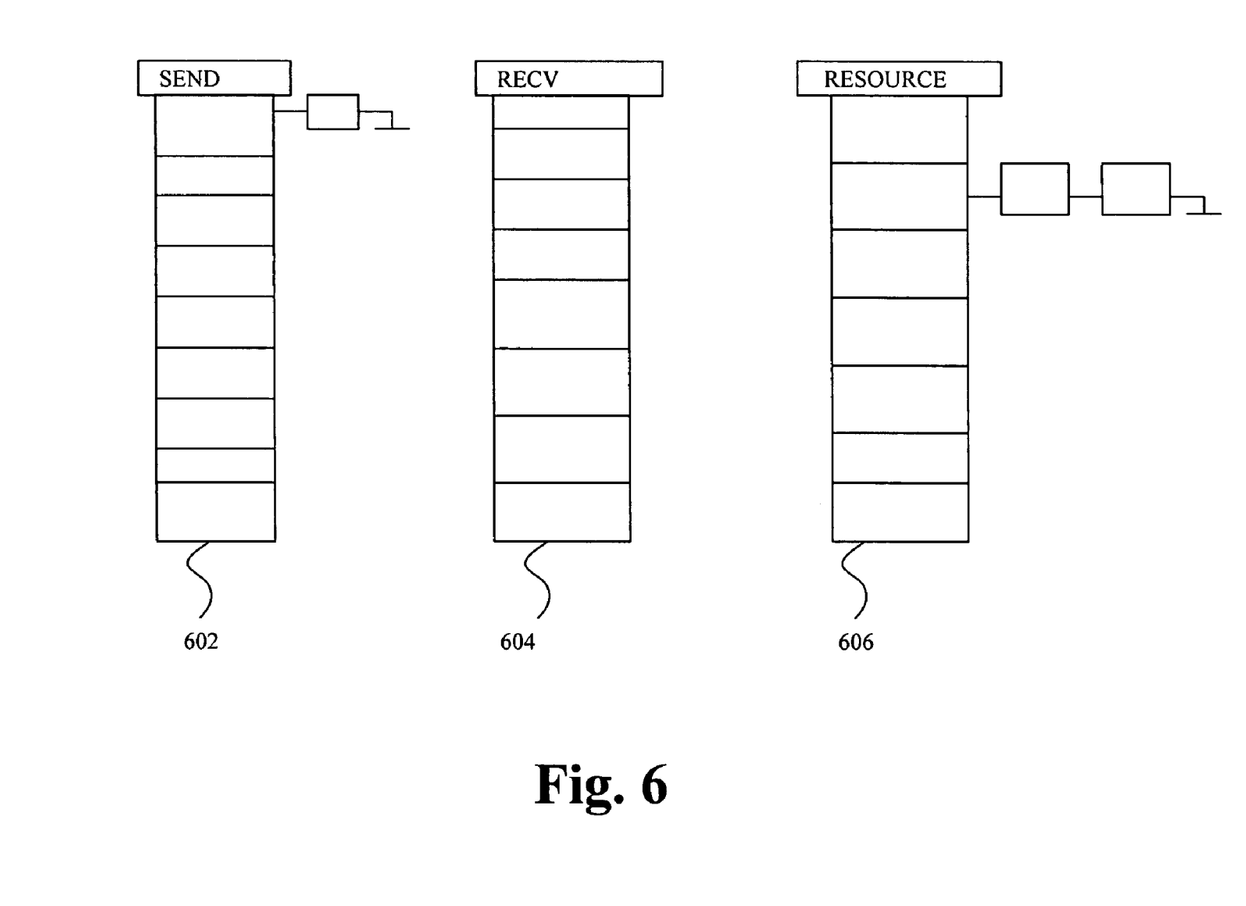
FIG. 6 is a diagram of hash tables to store results of trace paring operation.

The analyzer 506 reviews each trace in the trace files 508 to verify its format and to create a set of data having relevant information needed to create new versions of the traces having markup language syntax. An example of such relevant information includes information that identify traces having particular keywords, such as "send" and "recv" keywords. According to an embodiment, tables are created to store this relevant information. As shown in FIG. 6, the Analyzer 506 creates a separate hash table 602, 604, and 606 for each type of keyword defined in the set of TFGs 502. In the example of FIG. 6, hash table 602 corresponds to the "send" keyword, hash table 604 to the "recv" keyword, and hash table 606 to the "resource" keyword. Each trace on a single node should correspond to an unique trace identifier, with the entries in the hash tables hashed using the unique trace identifier as the key. Each hash table entry contains the relevant information extracted from the trace text file.

Referring back to FIG. 5, a trace miner mechanism 510 utilizes the information compiled by analyzer 506 to build a relational network that represents relationship patterns, e.g., navigational patterns, in the trace files 508. The task of data mining often involves determinations of relationships in data. The trace miner 510 accesses the hash tables produced by the analyzer 506 and also the trace files 508 as input to attempt to find relevant relationships in the trace files 508.

An embodiment of the present invention employs semantic networking to represent relationships identified in trace files 508. A semantic network comprises a structure consisting of nodes and links. In this disclosure, nodes represent resources such as locks, semaphores, sources of a message, etc. The links define relationships between nodes, such as navigational patterns. Examples of such relationships include "mastered by", "blocked by", and "send to" operations for resources. Many languages and system systems are available for representing a semantic network; one such example is SnePS. Semantic networks may also be represented using SGML or its variants such as XML and HTML.

Figure 7:
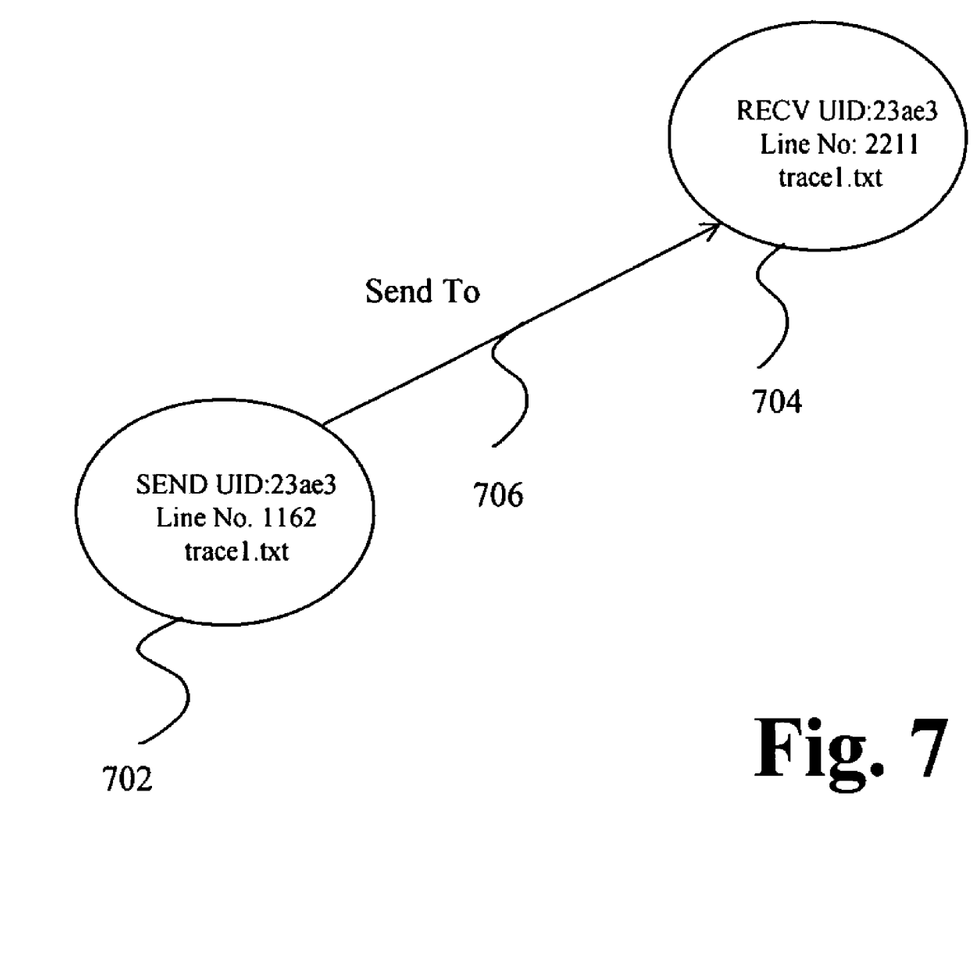
FIG. 7 is a diagram of an example semantic network.

FIG. 7 shows an example of a semantic network in which node 702 corresponds to a first trace statement and node 704 corresponds to a second trace statement. In this example, the trace statement of node 702 relates to a "send" operation that is captured at line 1162 of a first trace file "trace1.txt." The trace statement of node 704 relates to a corresponding "recv" operation that is captured at line 2211 of a second trace file "trace2.txt." Note that both nodes share a common unique identifier "23ae3". This is the unique identifier that permits ready identification of a relationship between the two underlying trace statements for these nodes, and consequently indicates that a link 706 should extend between nodes 702 and 704. In this example, since the nodes represents a send-recv pair, the link 706 represents a "send to" relationship between the two nodes 702 and 704.

Referring back to FIG. 5, a network builder mechanism, shown as the Diagnostic Navigational Pattern Builder or "DNP" Builder 514, performs the function of constructing one or more disjoint semantic networks representing relationships between various traces in trace files 508. The DNP Builder 514 uses the relationships among the keywords as described in the TFGs to discover identifiable patterns and relationships. The DNP Builder 514 uses the hash tables and the keyword relationships created by the Analyzer and attempts to create relationship networks. Sometimes relationships may exist between two entries in the same hash table. Relationships may also exist between different hash tables. The DNP Builder 514 may employ any standard mechanism to represent these relationships (e.g., SGML, XML, SNePS or any other language or system capable of representing a semantic network.

These semantic networks may be persistently stored in a database 518 and can be retrieved when required. According to an embodiment, the DNP Builder 514 needs to be run only once for each set of trace files and of TFGs.

A network navigator mechanism, shown as DNP Navigator 516, retrieves the networks from the database 518 and performs the function of searching the networks for particular resources or relationships between resources. Instructions may be provided to the DNP Navigator 516 to retrieve particular nodes or a sub-network corresponding to a given relationship. For example, a user may be interested in knowing the master owner of a particular lock resource. The DNP Navigator 516 may be instructed to search through the set of networks and attempt to match the node and relationships to retrieve all the nodes or sub-networks matching the query.

The DNP Navigator 516 supplies a manifestation tool 512 with trace network data corresponding to traces to be displayed to a user. The manifestation tool 512 is a user interface or browser component and could be constructed using a programming language such as Java. The manifestation tool 512 acts as a renderer for semantic networks built by the DNP Builder 514. The manifestation tool 512 inputs sets of networks from the trace miner 510 along with raw trace statements from trace files 508 and creates appropriately modified versions of the trace files using markup language syntax.

Figure 8:
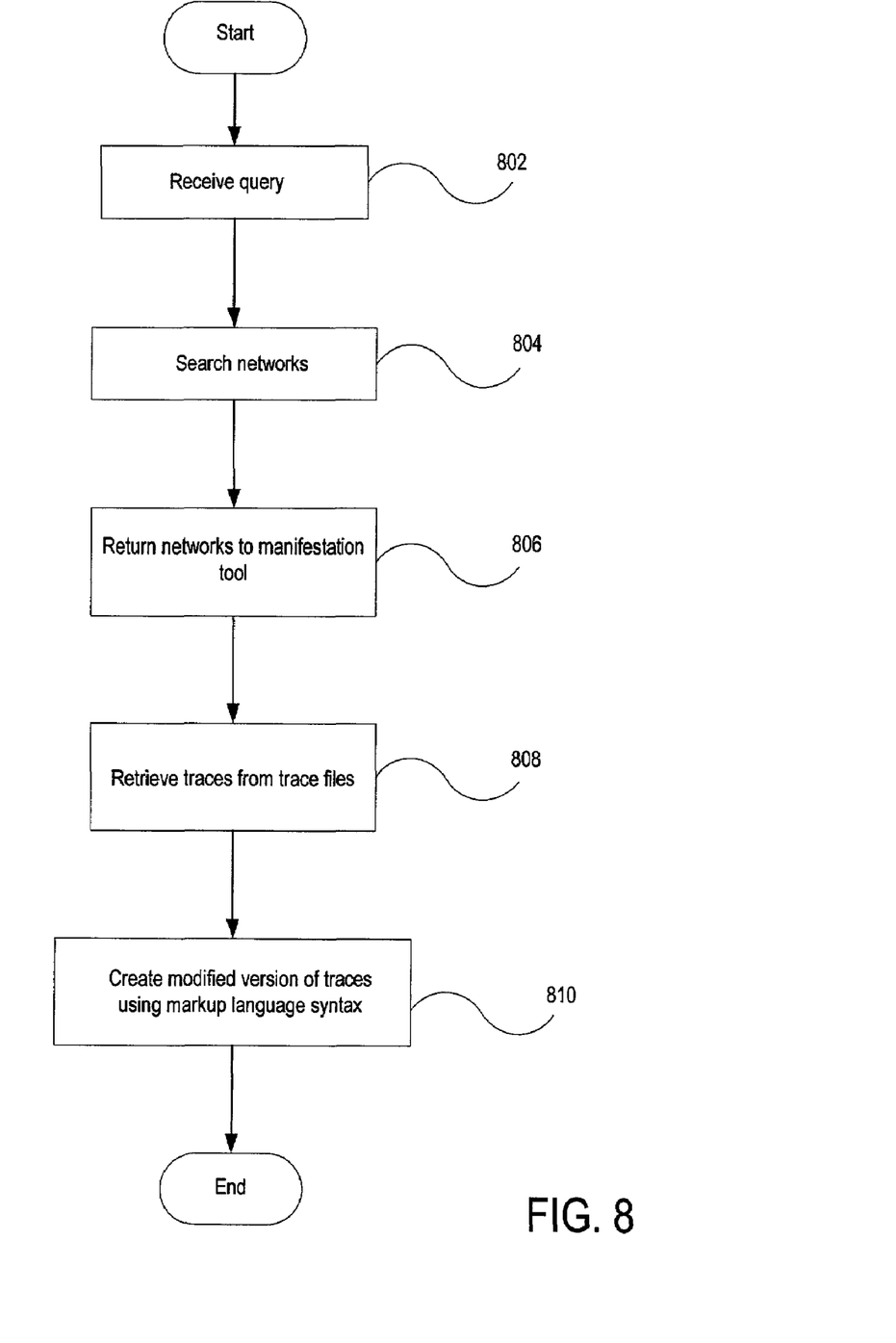
FIG. 8 is a flowchart of a process for utilizing traces according to an embodiment of the invention.

FIG. 8 depicts a flowchart of an embodiment of this aspect of the invention. At 802, a query is received at the manifestation tool 512 pertaining to one or more resources. The manifestation tool 512 instructs the DNP Navigator 516 to search database 518 for any networks corresponding to the queries resources that have previously been constructed by DNP Builder 514 (804). If such networks are found, then those networks are returned to the manifestation tool 512 (806). These networks identify trace statements having interrelationships that are candidates for including navigable hyperlinks. The manifestation tool 512 also retrieves traces from trace files 508 corresponding to the query (808). Based upon the network data retrieved from the DNP Navigator 516, the manifestation tool 512 creates modified versions of some or all the traces to include hyperlinks to related traces (810). These modified versions of the traces are thereafter materialized for viewing by a browser or viewer.

To illustrate the invention, consider if a user would like to view a navigable version of the trace statements corresponding to nodes 702 and 704 in FIG. 7. The manifestation tool 512 would (a) instruct DNP Navigator 516 to search for and retrieve the semantic network shown in FIG. 7, (b) identify the source trace statements corresponding to this semantic network (e.g., line 1162 from trace1.txt and line 2211 from trace2.txt), (c) retrieve these trace statements from trace files 508, (d) create a modified version of these trace statements to include navigable hyperlinks corresponding to link 706, and (d) materialize the modified versions of these traces in a markup language syntax usable by the user's browser or viewer.

Any query may be posed to the manifestation tool 512 regarding one or more resources. Callbacks, such as user-defined callbacks in a TFG, may be specified as part of a query. The manifestation tool 512 or callback would pass the query to the DNP Navigator 516. The DNP Navigator 516 searches through the sets of networks and return the appropriate nodes to manifestation tool 512. Both the manifestation tool 512 and/or the callback should able to communication with the DNP Navigator 516 because a query may require complex algorithmic interpretations of traces and may be possible only if user defined callbacks are specified.

System Architecture Overview

Figure 3:
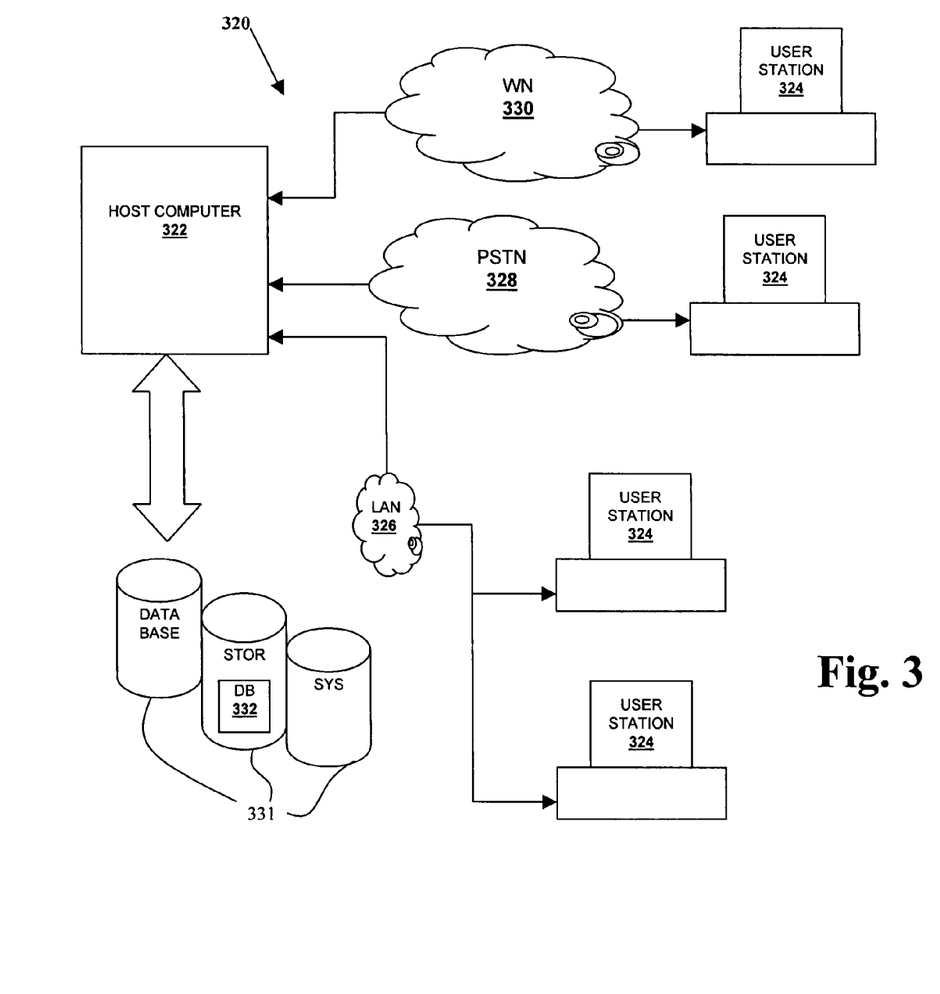
FIGS. 3 and 4 are diagram of system architectures with which the present invention may be implemented.

Referring to FIG. 3, in an embodiment, a computer system 320 includes a host computer 322 connected to a plurality of individual user stations 324. In an embodiment, the user stations 324 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 324 are connected to the host computer 322 via a local area network ("LAN") 326. Other user stations 324 are remotely connected to the host computer 322 via a public telephone switched network ("PSTN") 328 and/or a wireless network 330.

In an embodiment, the host computer 322 operates in conjunction with a data storage system 331, wherein the data storage system 331 contains a database 332 that is readily accessible by the host computer 322. Note that a multiple tier architecture can be employed to connect user stations 324 to a database 332, utilizing for example, a middle application tier (not shown). In alternative embodiments, the database 332 may be resident on the host computer, stored, e.g., in the host computer's ROM, PROM, EPROM, or any other memory chip, and/or its hard disk. In yet alternative embodiments, the database 332 may be read by the host computer 322 from one or more floppy disks, flexible disks, magnetic tapes, any other magnetic medium, CD-ROMs, any other optical medium, punchcards, paper-tape, or any other physical medium with patterns of holes, or any other medium from which a computer can read. In an alternative embodiment, the host computer 322 can access two or more databases 332, stored in a variety of mediums, as previously discussed.

Figure 4:
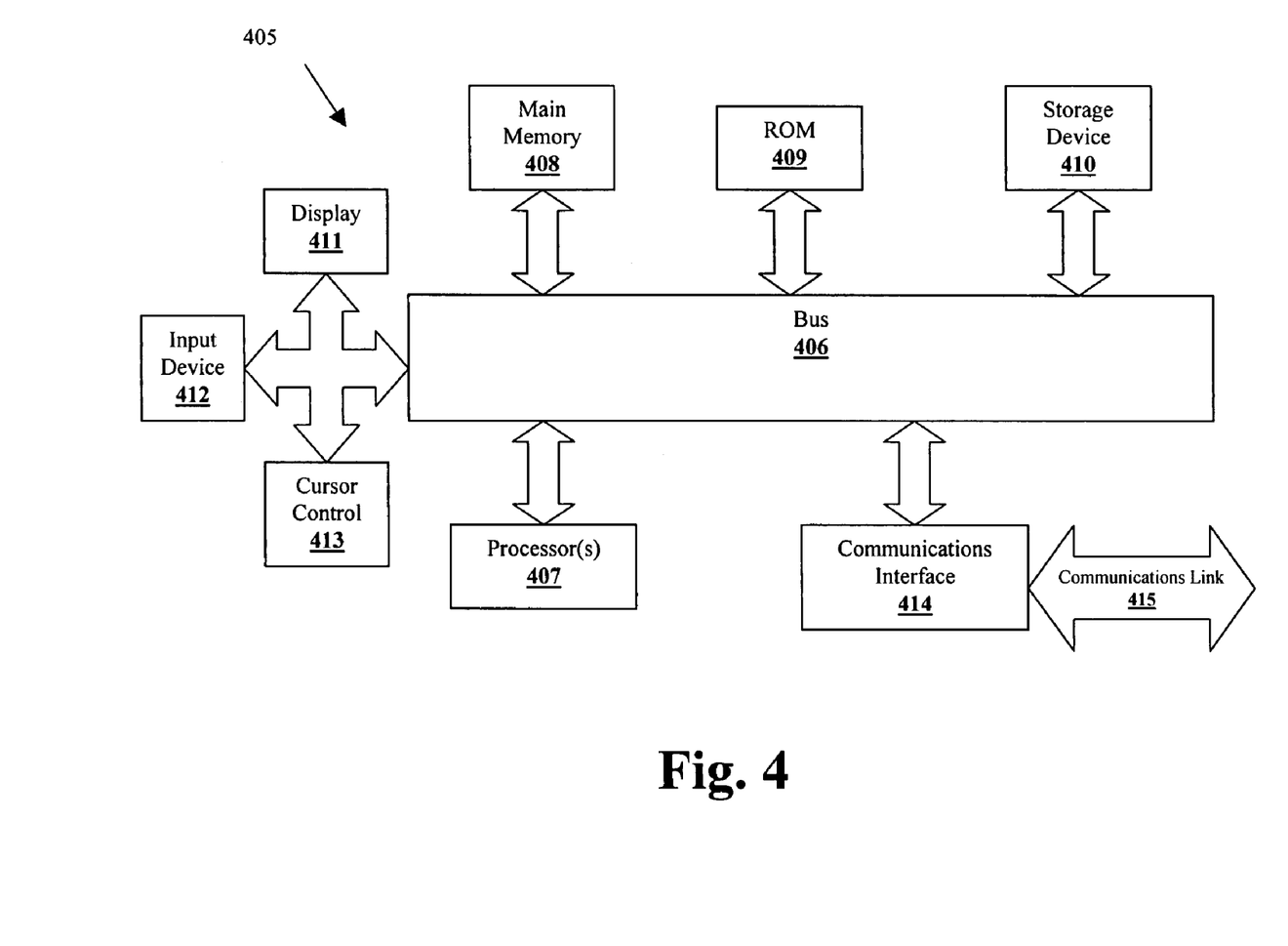

Referring to FIG. 4, in an embodiment, each user station 324 and the host computer 322, each referred to generally as a processing unit, embodies a general architecture 405. A processing unit includes a bus 406 or other communication mechanism for communicating instructions, messages and data, collectively, information, and one or more processors 407 coupled with the bus 406 for processing information. A processing unit also includes a main memory 408, such as a random access memory (RAM) or other dynamic storage device, coupled to the bus 406 for storing dynamic data and instructions to be executed by the processor(s) 407. The main memory 408 also may be used for storing temporary data, i.e., variables, or other intermediate information during execution of instructions by the processor(s) 407. A processing unit may further include a read only memory (ROM) 409 or other static storage device coupled to the bus 406 for storing static data and instructions for the processor(s) 407. A storage device 410, such as a magnetic disk or optical disk, may also be provided and coupled to the bus 406 for storing data and instructions for the processor(s) 407.

A processing unit may be coupled via the bus 406 to a display device 411, such as, but not limited to, a cathode ray tube (CRT), for displaying information to a user. An input device 412, including alphanumeric and other columns, is coupled to the bus 406 for communicating information and command selections to the processor(s) 407. Another type of user input device may include a cursor control 413, such as, but not limited to, a mouse, a trackball, a fingerpad, or cursor direction columns, for communicating direction information and command selections to the processor(s) 407 and for controlling cursor movement on the display 411.

According to one embodiment of the invention, the individual processing units perform specific operations by their respective processor(s) 407 executing one or more sequences of one or more instructions contained in the main memory 408. Such instructions may be read into the main memory 408 from another computer-usable medium, such as the ROM 409 or the storage device 410. Execution of the sequences of instructions contained in the main memory 408 causes the processor(s) 407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 407. Such a medium may take many forms, including, but not limited to, non-volatile, volatile and transmission media. Non-volatile media, i.e., media that can retain information in the absence of power, includes the ROM 409. Volatile media, i.e., media that can not retain information in the absence of power, includes the main memory 408. Transmission media includes coaxial cables, copper wire and fiber optics, including the wires that comprise the bus 406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 407 can retrieve information. Various forms of computer-usable media may be involved in providing one or more sequences of one or more instructions to the processor(s) 407 for execution. The instructions received by the main memory 408 may optionally be stored on the storage device 410, either before or after their execution by the processor(s) 407.

Each processing unit may also include a communication interface 414 coupled to the bus 406. The communication interface 414 provides two-way communication between the respective user stations 424 and the host computer 422. The communication interface 414 of a respective processing unit transmits and receives electrical, electromagnetic or optical signals that include data streams representing various types of information, including instructions, messages and data. A communication link 415 links a respective user station 424 and a host computer 422. The communication link 415 may be a LAN 326, in which case the communication interface 414 may be a LAN card. Alternatively, the communication link 415 may be a PSTN 328, in which case the communication interface 414 may be an integrated services digital network (ISDN) card or a modem. Also, as a further alternative, the communication link 415 may be a wireless network 330. A processing unit may transmit and receive messages, data, and instructions, including program, i.e., application, code, through its respective communication link 415 and communication interface 414. Received program code may be executed by the respective processor(s) 407 as it is received, and/or stored in the storage device 410, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A computer implemented process for materializing a trace in a markup language syntax, the process comprising:
   creating a meta-language grammar;
   creating a first trace grammar in which the first trace grammar complies with rules of the meta-language grammar;
   creating a second trace grammar wherein the second trace grammar is grammatically different than the first trace grammar wherein there is a detected format difference between the first trace grammar and a second trace grammar and in which the second trace grammar also complies with the rules of the meta-language grammar;
   generating one or more traces compliant with the trace grammars, in which a first set of the one or more traces is compliant with the first trace grammar and a second set of the one or more traces is compliant with the second trace grammar, the first set of the one or more traces analyzed for compliance with the first trace grammar;
   identifying parsing rules based upon an analysis of the trace grammars;
   parsing the one or more traces;
   identifying interrelationships within the one or more traces; and
   generating a new version of the one or more traces using a markup language syntax.

2. The process of claim 1 further comprising:
   storing results of parsing in one or more tables.

3. The process of claim 2 in which the one or more tables comprises hash tables corresponding to keywords in the one or more traces.

4. The process of claim 1 further comprising:
   building a semantic network corresponding to the identified interrelationships.

5. The process of claim 4 in which the semantic network comprises at least one link and at least two nodes.

6. The process of claim 5 in which the at least two nodes represent resources and the at least one link defines a relationship between the at least two nodes.

7. The process of claim 5 in which each of the at least two nodes is represented as a keyword-UID combination.

8. The process of claim 4 in which the semantic network is represented using a semantic network representation language.

9. The process of claim 8 in which the semantic network representation language is selected from the group consisting of SnePs, SGML, XML, and HTML.

10. The process of claim 4 in which the semantic network is persistently stored.

11. The process of claim 4 in which the semantic network is built using a semantic network builder system.

12. The process of claim 4 further comprising:
    performing a search of the semantic network based upon a received query.

13. The process of claim 12 in which the semantic network is utilized to identify hyperlinks to be embedded into the new version of the one or more traces.

14. The process of claim 1 in which the new version of the one or more traces comprises a hyperlink.

15. The process of claim 1 further comprising defining a second meta-language grammar.

16. A system for materializing a trace having markup language syntax, comprising:
    a first mechanism that receives a plurality of trace grammars that are based upon creation of a meta-language grammar,
    the plurality of trace grammars complies with rules of the meta-language grammar, wherein the plurality of trace grammars are grammatically different than each other and wherein there is a detected format difference between a first trace grammar and a second trace grammar within the plurality of trace grammars,
    the plurality of trace grammars modifiable within rules of a meta-language grammar, a parser to parse a plurality of traces complying with the plurality of trace grammars, in which parsing rules have been identified based upon an analysis of the trace grammars;
    the plurality of traces comprises a first set of one or more traces that is compliant with the first trace grammar and a second set of the one or more traces that is compliant with the second trace grammar, the first set of the one or more traces analyzed for compliance with the first trace grammar;

a second mechanism to build one or more semantic networks based upon interrelationships for the plurality of traces;

a manifestation mechanism to generate at least one new version of the plurality of traces to include at least one hyperlink based upon the one or more semantic networks; and a memory for storing data corresponding to the plurality of traces.

17. The system of claim 16 in which the parser stores results of the parsing in one or more tables.

18. The system of claim 17 in which the one or more tables comprises hash tables corresponding to keywords in the plurality of traces.

19. The system of claim 16 in which each of the one or more semantic networks comprises at least two nodes and at least one link.

20. The system of claim 19 in which each of the at least two nodes represent a resource and the at least one link defines a relationship.

21. The system of claim 19 in which each of the at least two nodes is represented as a keyword-UID combination.

22. The system of claim 16 in which the one or more semantic networks are represented using a semantic network representation language.

23. The system of claim 22 in which the semantic network representation language is selected from the group consisting of SnePs, SGML, XML, and HTML.

24. The system of claim 16 in which the one or more semantic networks are persistently stored.

25. The system of claim 16 further comprising:

a network navigator mechanism to search the one or more semantic networks.

26. The system of claim 25 in which the network navigator mechanism performs a search of the one or more semantic networks based upon receiving a query.

27. A computer program product that includes a computer volatile or non-volatile medium having a sequence of instructions which, when executed by a processor, causes said processor to execute a process for materializing a trace in a markup language syntax, said process comprising:

creating a first trace grammar in which the first trace grammar complies with rules of a meta-language grammar;

creating a second trace grammar wherein the second trace grammar is grammatically different than the first trace grammar wherein there is a detected format difference between the first trace grammar and a second trace grammar and in which the second trace grammar also complies with the rules of the meta-language grammar;

generating one or more traces compliant with the trace grammars, in which a first set of the one or more traces is compliant with the first trace grammar and a second set of the one or more traces is compliant with the second trace grammar, the first set of the one or more traces analyzed for compliance with the first trace grammar;

identifying parsing rules based upon an analysis of the trace grammars;

parsing the one or more traces;

identifying interrelationships within the one or more traces; and generating a new version of the one or more traces using a markup language syntax.

28. The computer program product of claim 27, further comprising:

building a semantic network corresponding to the identified interrelationships.

29. The computer program product of claim 27, wherein the new version of the one or more traces comprises a hyperlink.

30. The computer program product of claim 27, further comprising:

defining a second meta-language grammar.

* * * * *